(12) United States Patent
Ochi

(10) Patent No.: US 9,535,699 B2
(45) Date of Patent: Jan. 3, 2017

(54) PROCESSOR, MULTIPROCESSOR SYSTEM, COMPILER, SOFTWARE SYSTEM, MEMORY CONTROL SYSTEM, AND COMPUTER SYSTEM

(71) Applicant: PANASONIC CORPORATION, Osaka (JP)

(72) Inventor: Naoki Ochi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 214 days.

(21) Appl. No.: 14/479,003

(22) Filed: Sep. 5, 2014

(65) Prior Publication Data

US 2014/0380021 A1 Dec. 25, 2014

Related U.S. Application Data

(63) Continuation of application No. PCT/JP2013/000956, filed on Feb. 20, 2013.

(30) Foreign Application Priority Data

Mar. 9, 2012 (JP) ................................. 2012-053646

(51) Int. Cl.
*G06F 9/30* (2006.01)
*G06F 9/38* (2006.01)

(52) U.S. Cl.
CPC ......... *G06F 9/3016* (2013.01); *G06F 9/30189* (2013.01); *G06F 9/30196* (2013.01); *G06F 9/3885* (2013.01)

(58) Field of Classification Search
None
See application file for complete search history.

(56) References Cited

U.S. PATENT DOCUMENTS 5,394,558 A  2/1995 Arakawa et al.
5,568,646 A  10/1996 Jaggar
(Continued)

FOREIGN PATENT DOCUMENTS

JP   1-320540 A   12/1989
JP   9-512651 A   12/1997
(Continued)

OTHER PUBLICATIONS

International Publication and Search Report for application No. PCT/JP2013/000956 dated Mar. 26, 2013.

*Primary Examiner* — Eric Coleman
(74) *Attorney, Agent, or Firm* — McDermott Will & Emery LLP

(57) ABSTRACT

A processor includes: a first instruction processing unit that, in a first mode, receives a first input including instructions included in a first instruction set; a second instruction processing unit that, in a second mode, receives the first input, the second instruction processing unit having a simpler configuration than the first instruction processing unit; a third instruction processing unit that, in a third mode, receives a second input including instructions included in a second instruction set, the second instruction set including part of the instructions included in the first instruction set, the third instruction processing unit having a simpler configuration than the first instruction processing unit and the second instruction processing unit; a selection unit that selects, according to a mode, a result of decoding by one of the instruction processing units; and an instruction execution unit that executes an instruction according to the selected result of decoding.

18 Claims, 14 Drawing Sheets

(56) References Cited

U.S. PATENT DOCUMENTS

| | | | |
|---|---|---|---|
| 5,638,525 A * | 6/1997 | Hammond | G06F 9/30043 712/209 |
| 5,781,750 A * | 7/1998 | Blomgren | G06F 9/30145 703/26 |
| 6,785,831 B2 | 8/2004 | Takada | |
| 7,000,094 B2 | 2/2006 | Nevill et al. | |
| 7,003,652 B2 | 2/2006 | Nevill et al. | |
| 7,134,119 B2 | 11/2006 | Nevill | |
| 7,149,878 B1 * | 12/2006 | Jensen | G06F 9/30076 712/209 |
| 7,890,734 B2 * | 2/2011 | Golla | G06F 9/3861 712/214 |
| 7,890,735 B2 * | 2/2011 | Tran | G06F 9/30181 712/16 |
| 8,347,067 B2 | 1/2013 | Greenhalgh et al. | |
| 2002/0066003 A1 | 5/2002 | Nevill et al. | |
| 2002/0066004 A1 | 5/2002 | Nevill et al. | |
| 2002/0069402 A1 | 6/2002 | Nevill et al. | |
| 2002/0083302 A1 | 6/2002 | Nevill et al. | |
| 2002/0108103 A1 | 8/2002 | Nevill | |
| 2003/0110406 A1 | 6/2003 | Takada | |
| 2004/0015911 A1 * | 1/2004 | Hinsley | G06F 8/47 717/147 |
| 2004/0015914 A1 * | 1/2004 | Renouf | G06F 9/445 717/148 |
| 2004/0172519 A1 * | 9/2004 | Nakajima | G06F 9/30076 712/209 |
| 2007/0296613 A1 * | 12/2007 | Hussain | H04N 19/61 341/50 |
| 2009/0187742 A1 | 7/2009 | Greenhalgh et al. | |
| 2011/0107064 A1 | 5/2011 | Nakaya et al. | |

FOREIGN PATENT DOCUMENTS

| | | |
|---|---|---|
| JP | 2003-233434 A | 8/2003 |
| JP | 3497516 B2 | 2/2004 |
| JP | 2004-522215 A | 7/2004 |
| JP | 2006-146953 A | 6/2006 |
| JP | 2006-285760 A | 10/2006 |
| JP | 2009-176303 A | 8/2009 |
| JP | 2011-96033 A | 5/2011 |
| WO | 9530187 A1 | 11/1995 |
| WO | 0229507 A2 | 4/2002 |

* cited by examiner

PROCESSOR, MULTIPROCESSOR SYSTEM, COMPILER, SOFTWARE SYSTEM, MEMORY CONTROL SYSTEM, AND COMPUTER SYSTEM

CROSS REFERENCE TO RELATED APPLICATION(S)

This is a continuation application of PCT International Application No. PCT/JP2013/000956 filed on Feb. 20, 2013, designating the United States of America, which is based on and claims priority of Japanese Patent Application No. 2012-053646 filed on Mar. 9, 2012. The entire disclosures of the above-identified applications, including the specifications, drawings and claims are incorporated herein by reference in their entirety.

FIELD

The present disclosure relates to, for example, processors for digital network systems or digital equipment and systems for the processors and, in particular, to a processor or others including an instruction decoder which can be operated at a high speed and an instruction decoder which can be operated at a low speed.

BACKGROUND

With an increase in Internet connection by recent digital equipment, various functions are implemented on a device by software. Thus, the state of the digital equipment varies according to mainly user's operation. Such states include, for example, the state where extremely high performance and various functions are necessary, the state where high performance is unnecessary but various functions are necessary, and the state where only simple functions with low performance are satisfactory but continuous drive is necessary for a long time.

For instance, while waiting for an email or a phone call, a user is not performing an operation on equipment. In this case, the equipment needs to be operated for a long time, but low performance is acceptable. Thus, a processor which can be operated at a high speed and execute complicated processing or instruction is unnecessary.

Meanwhile, if the user performs an operation such as listening to music, recording music, viewing a video, or recording a video, user's operation on the equipment is not much involved. However, a certain load is continuously applied to the equipment. In this case, there is no need to operate the equipment at a very high speed, but a processor is necessary which can process moderately complicated processing or instruction and maintain a certain processing speed.

Moreover, in browsing the web, writing an email, managing a schedule, creating a memo, or performing other operations, the user actively performs the operation. In this case, operations on the equipment mainly involve, for example, character input, click, and flick. Although load placed on the equipment is not so large, a high response speed is necessary. Thus, complicated processing or instruction is not so much necessary. Meanwhile, a processor which can operate at a high speed, depending on a situation is necessary.

Moreover, when the user, for example, plays games, uses application software handling an image, or uses rich content on the Web, the equipment, for example, changes an image or a sound quickly in response to user's active operation on the equipment. This means that a load on the equipment and a change in load are large on average. In this case, a processor is necessary which can execute complicated processing or instruction and operate at a high speed, depending on a situation.

A current processor for a mobile device (ARM) is a power-saving device, but the performance is not satisfactory. This is because the processor simplifies an executable instruction set for power saving, and the whole processor including an instruction processing unit and an instruction decoder is kept simple.

Moreover, a processor (e.g., Intel and AMD) for a personal computer (PC) is a high-performance processor, but consumes a large amount of power. Such processor has an instruction set including various and complicated instructions, and can execute these instructions. However, this makes, in particular, an instruction processing unit and an instruction decoder complicated and huge.

To improve the above situation, a higher-performance processor has been newly developed for a mobile device (ARM), and this processor and a processor which can be operated with low power consumption are both installed to switch between these processors, depending on a situation (e.g., big.LITTLE and Tegra3). FIG. 12 illustrates an example of a processor including high-performance processors (e.g., CPUs 0 to 3) and a processor which can be operated with low power consumption (e.g., CPU 5).

Moreover, the configuration of a processor for a PC (e.g., Intel and AMD) is simplified to some extent (Atom and Bobcat) so that a reduction in amount of power consumption is more significant than a decrease in performance.

Moreover, as FIG. 13 illustrates, a processor has been suggested which concurrently uses an instruction decoder which can decode an instruction executed for a short time, at a high speed and an instruction decoder which can decode an instruction executed for a long time, at a low speed with low power consumption (e.g., Patent Literature 1).

Moreover, as FIG. 14 illustrates, a processor has been suggested which includes at least one fixed circuit decoder which can decode only part of instructions and at least one execution circuit which executes an instruction, and decodes an instruction which cannot be decoded by the fixed circuit decoder, using a decoder which uses one microcode ROM, to execute the decoded instruction in the execution circuit (e.g., Patent Literature 2).

CITATION LIST

Patent Literature

[PTL 1] Japanese Unexamined Patent Application Publication No. 1-320540
[PTL 2] Japanese Patent No. 3,497,516

SUMMARY

Technical Problem

However, any example has various problems such as insufficient performance, an imbalance between power or cost and performance, a cost increase and performance degradation due to addition of a mechanism necessary for switching, and restrictions on instruction expansion for future addition of functions.

In view of these problems, the present disclosure provides, for example, a processor which achieves necessary performance and functions with less power and at a lower cost.

Solution to Problem

A processor according to an aspect of the present disclosure includes: a first instruction processing unit that, in a first mode, receives a first input including instructions included in a first instruction set, and schedules and decodes the instructions included in the first input; a second instruction processing unit that, in a second mode, receives the first input, and schedules and decodes the instructions included in the first input, the second instruction processing unit having a simpler configuration than the first instruction processing unit; a third instruction processing unit that, in a third mode, receives a second input including instructions included in a second instruction set, and schedules and decodes the instructions included in the second input, the second instruction set including part of the instructions included in the first instruction set, the third instruction processing unit having a simpler configuration than the first instruction processing unit and the second instruction processing unit; a selection unit that selects, according to a mode, one of results of decoding by the first instruction processing unit, the second instruction processing unit, and the third instruction processing unit; and an instruction execution unit that executes an instruction according to the one of results of decoding selected by the selection unit.

The first instruction processing unit, the second instruction processing unit, and the third instruction processing unit have configurations as described above. That is, the first instruction processing unit is a performance-oriented instruction processing mechanism as installed in a conventional high-performance processor, and can process all the instructions defined as the first instruction set. Moreover, the first instruction processing unit can perform complicated processing such as changing the order of instructions (out of order) and processing more than one instruction in parallel for higher performance, and can operate at a high speed. Moreover, the second instruction processing unit can process all the instructions included in the first instruction set. Meanwhile, the second instruction processing unit has a simpler configuration than the first instruction processing unit, and is an instruction processing mechanism suitable for performing an operation at a relatively low speed. Moreover, the third instruction processing unit can process only the instructions which are defined as the second instruction set and always necessary as part of the first instruction set. Moreover, the third instruction processing unit has a simpler configuration than the first instruction processing unit, and is an instruction processing mechanism which aims at reduction in power consumption, by performing an operation at a relatively low speed. Inclusion of the third instruction processing unit in the processor can achieve necessary performance and functions with less power and at a lower cost. It should be noted that there may be an instruction processing unit other than the three types of instruction processing units. There may be the fourth and following instruction processing units.

Moreover, the first instruction processing unit may schedule and decode the instructions included in the first input while changing an input order of the instructions, the second instruction processing unit may schedule and decode the instructions included in the first input, in accordance with the input order, and the third instruction processing unit may schedule and decode the instructions included in the second input, in accordance with an input order of the instructions.

According to this configuration, the out-of-order processing by the first instruction processing unit improves the performance of the processor. Moreover, in-order processing by the second and third instruction processing units allows the processor to operate with low power consumption.

Moreover, if the first instruction processing unit and the second instruction processing unit schedule and decode a same instruction, the second instruction processing unit may have a longer decoding time, a lower heating value, and a smaller heat generating area than the first instruction processing unit.

Moreover, if the first instruction processing unit and the third instruction processing unit schedule and decode a same instruction, the third instruction processing unit may have a longer decoding time, a lower heating value, and a smaller heat generating area than the first instruction processing unit.

Moreover, the third instruction processing unit may further schedule and decode, in the second mode, the instructions included in the second instruction set, out of the instructions included in the first input, and the processor may further include a fourth instruction processing unit that schedules and decodes, in the second mode, instructions not included in the second instruction set, out of the instructions included in the first input.

Having the fourth instruction processing unit allows the third instruction processing unit and the fourth instruction processing unit to perform the processing performed by the second instruction processing unit, and allows the third instruction processing unit and the fourth instruction processing unit to operate in parallel. That is, the third instruction processing unit and the fourth instruction processing unit can function as the second instruction processing unit. It should be noted that the second instruction processing unit may include the third instruction processing unit and the fourth instruction processing unit.

Moreover, all the instructions included in the second instruction set may have a same length.

Thus, a circuit for achieving the decoding processing by the third instruction processing unit can have a simple configuration. This allows the third instruction processing unit to operate with low consumption power.

Moreover, mode switching may be written in a program executed by the processor. One of the first instruction processing unit, the second instruction processing unit, and the third instruction processing unit may finish scheduling and decoding instructions according to the mode switching written in the program. An other instruction processing unit of the first instruction processing unit, the second instruction processing unit, and the third instruction processing unit may start scheduling and decoding instructions according to the mode switching written in the program. The selection unit may switch between results of decoding to be selected, according to the mode switching written in the program, the decoding being performed by the first instruction processing unit, the second instruction processing unit, and the third instruction processing unit.

Moreover, the program executed by the processor may include an instruction for the mode switching.

This configuration enables automatic switching between the modes while executing the program.

Moreover, if the processor is in a first state satisfying a predetermined first condition, a mode may be automatically switched to the first mode.

Moreover, if the processor is in a second state satisfying a predetermined second condition, the mode may be automatically switched to the second mode.

Moreover, if the processor is in a third state satisfying a predetermined third condition, the mode may be automatically switched to the third mode.

Moreover, in a state where only the third instruction processing unit is being operated, if an instruction not included in the second instruction set, out of the instructions included in the first instruction set is inputted, a mode may be switched to the second mode, and the second instruction processing unit may schedule and decode the inputted instruction.

Moreover, the processor described above may include a power supply control mechanism which, during mode switching, interrupts power supply or clock supply to an instruction processing unit which finishes scheduling and decoding instructions, among the first instruction processing unit, the second instruction processing unit, and the third instruction processing unit, and starts power supply or clock supply to an instruction processing unit which starts scheduling and decoding instructions, among the first instruction processing unit, the second instruction processing unit, and the third instruction processing unit.

This configuration can avoid power supply or clock supply to an instruction processing unit which is not performing processing. Thus, power consumption by the processor can be reduced.

A multiprocessor system according to another aspect of the present disclosure includes a plurality of the processors described above. Mode switching is written in a program executed by the plurality of the processors. A total number of processors to be operated or an operation speed of each of the plurality of the processors is changed according to the mode switching written in the program. For each processor, one of the first instruction processing unit, the second instruction processing unit, and the third instruction processing unit finishes scheduling and decoding instructions, and an other instruction processing unit of the first instruction processing unit, the second instruction processing unit, and the third instruction processing unit starts scheduling and decoding instructions. The selection unit of the processor switches between results of decoding to be selected, according to the mode switching written in the program, the decoding being performed by the first instruction processing unit, the second instruction processing unit, and the third instruction processing unit.

Inclusion of the above processor allows this multiprocessor to achieve effects and advantages similar to those achieved by the above processor.

A compiler according to another aspect of the present disclosure creates, from a source program, a machine program executed by the processor described above. An instruction indicating which mode of the first mode, the second mode, and the third mode the processor is operated in is written in the source program. If the instruction indicates that the processor is operated in the first mode, the compiler creates the machine program for causing the first instruction processing unit to schedule and decode instructions included in the first instruction set. If the instruction indicates that the processor is operated in the second mode, the compiler creates the machine program for causing the second instruction processing unit to schedule and decode the instructions included in the first instruction set. If the instruction indicates that the processor is operated in the third mode, the compiler creates the machine program for causing the third instruction processing unit to schedule and decode instructions included in the second instruction set.

By executing the machine program created by this compiler, the processor described above can drive one of the instruction processing units, in accordance with a mode indicated by an instruction specified in the source program. This can achieve necessary performance and functions with less power and at a lower cost.

A software system according to another aspect of the present disclosure is a software system as a program to be executed by the processor described above. The software system includes: at least one of a first program and a second program, the first program being executed by the processor in the first mode, the second program being executed by the processor in the second mode; a third program executed by the processor in the third mode; and a fourth program executed by the processor in the third mode, the fourth program controlling switching between the first program, the second program, and the third program to be executed, the switching being performed in response to mode switching.

The fourth program switches between other programs to be executed, and each program is executed on the processor described above. This can achieve necessary performance and functions with less power and at a lower cost.

A memory control system according to another aspect of the present disclosure is a memory control system used by the processor described above. The memory system includes a memory device which operates as a cash memory in the first mode, and operates as a main memory device in the third mode.

The memory device operates as the cash memory in the first mode, thereby allowing the memory device to operate at a high speed. Moreover, the memory device operates as the main memory device in the third mode, thereby allowing the memory device to operate with low power consumption. This can achieve necessary performance and functions with less power and at a lower cost.

Moreover, the memory control system described above may further include a control mechanism for transferring data stored in the memory device to another memory device when a mode is switched to the first mode or the third mode.

A computer system according to another aspect of the present disclosure includes the processor described above. The processor executes each program included in a software system. In the first mode, at least the first instruction processing unit schedules and decodes instructions included in the first program. In the second mode, at least the second instruction processing unit schedules and decodes instructions included in the second program. In the third mode, at least the third instruction processing unit schedules and decodes instructions included in the third program.

Each program is executed on the above processor. Thus, necessary performance and functions can be achieved with less power and at a lower cost.

Advantageous Effects

According to the present disclosure, necessary performance and functions can be achieved with less power and at a lower cost.

BRIEF DESCRIPTION OF DRAWINGS

These and other objects, advantages and features of the invention will become apparent from the following description thereof taken in conjunction with the accompanying drawings that illustrate a specific embodiment of the present invention.

DESCRIPTION OF EMBODIMENT

The following describes an embodiment in detail with reference to the drawings. It should be noted that the following embodiment represents a specific example. Numerical values, shapes, materials, structural elements, the arrangement and connection of the structural elements, steps, the order of the steps, and others indicated in the following embodiment are mere examples, and are not intended to limit the present disclosure. The present disclosure is defined by Claims. Therefore, among the structural elements in the following embodiment, the structural elements not recited in the independent claims representing the superordinate concept of the present disclosure are described as optional structural elements.

(Processor)

Figure 1:
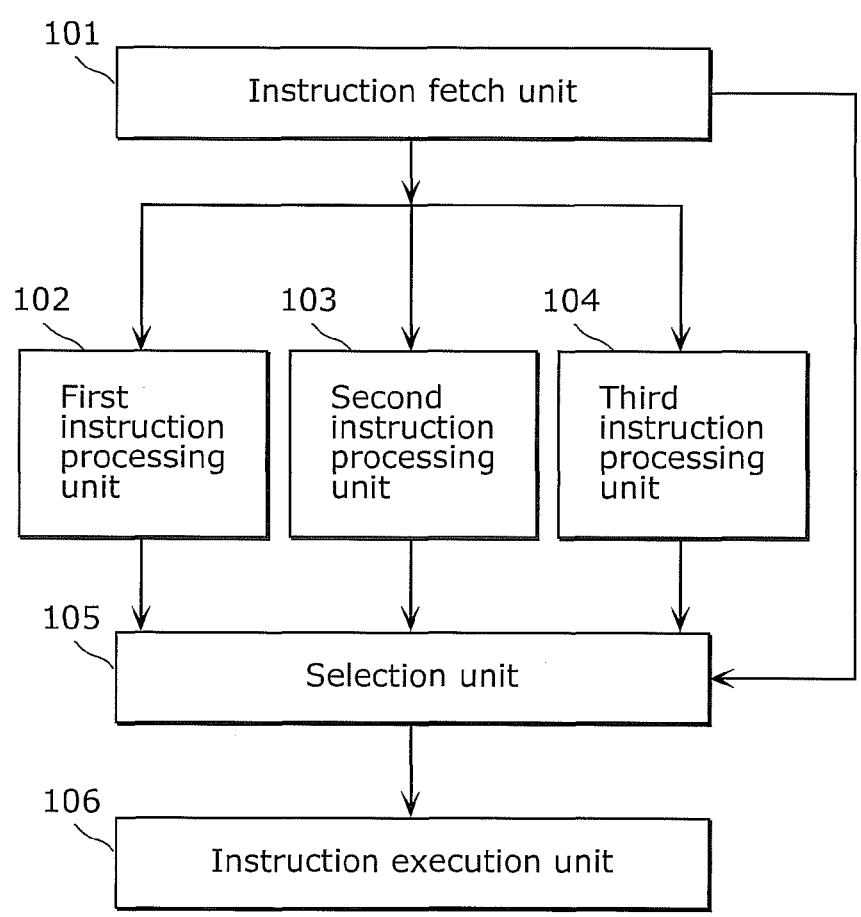
FIG. 1 illustrates a configuration of a processor according to the embodiment.

FIG. 1 illustrates a configuration of a microprocessor according to the embodiment. The microprocessor (hereinafter, referred to as "processor") includes an instruction fetch unit 101, a first instruction processing unit 102, a second instruction processing unit 103, a third instruction processing unit 104, a selection unit 105, and an instruction execution unit 106.

The instruction fetch unit 101 fetches instructions from a memory storing a program, which is not illustrated in the figure, such as a basic memory (main memory) or a cash memory, and sends the fetched instructions to one of the first instruction processing unit 102, the second instruction processing unit 103, and the third instruction processing unit 104 in the following stage. It should be noted that the number of instructions which the instruction fetch unit 101 concurrently fetches may correspond to the ability of the instruction processing units.

The first instruction processing unit 102 receives instructions sent from the instruction fetch unit 101, executes processing such as determination of instruction processing order and decoding of the instructions, and outputs a decoding result to the selection unit 105.

As the first instruction processing unit 102, the second instruction processing unit 103 and the third instruction processing unit 104 also receive instructions sent from the instruction fetch unit 101, execute processing such as determination of instruction processing order and decoding of the instructions, and send decoding results to the selection unit 105.

The instruction fetch unit 101 sends the fetched instructions to one of the first instruction processing unit 102, the second instruction processing unit 103, and the third instruction processing unit 104. However, to which of the instruction processing units the instruction fetch unit 101 sends the fetched instructions is determined based on, for example, a state in which the processor is used or the type of a program. Control for saving power such as interruption of power supply or clock supply can be performed on an instruction processing unit to which the instructions have not been sent. For instance, the processor may further include a power supply control mechanism. During mode switching, the power supply control mechanism interrupts power supply or clock supply to an instruction processing unit which finishes scheduling and decoding instructions, among the first instruction processing unit 102, the second instruction processing unit 103, and the third instruction processing unit 104, and starts power supply or clock supply to an instruction processing unit which starts scheduling and decoding instructions, among the first instruction processing unit 102, the second instruction processing unit 103, and the third instruction processing unit 104.

The selection unit 105 accurately selects one of the decoding results from the first instruction processing unit 102, the second instruction processing unit 103, and the third instruction processing unit 104, and sends the result to the instruction execution unit 106 in the following stage.

Each of the first instruction processing unit 102, the second instruction processing unit 103, and the third instruction processing unit 104 may execute whole instruction decoding processing, to create a decoding result which can be sent to the instruction execution unit 106. However, after the selection unit 105 selects part of the decoding processing, the selection unit 105 may perform the rest of the decoding processing.

According to one of the decoding results from the instruction processing units, sent from the selection unit 105, the instruction execution unit 106 executes an instruction indicating, for example, reading or writing of data, various operations such as addition and subtraction or logical operation, or interrupt handling.

The instruction execution unit 106 may perform control for power saving corresponding to an instruction processing unit selected from among the first instruction processing unit 102, the second instruction processing unit 103, and the third instruction processing unit 104. That is, a similar power-saving function described above may be applied to the part of the instruction execution unit not in use corresponding to an instruction processing unit not in use.

Figure 2:
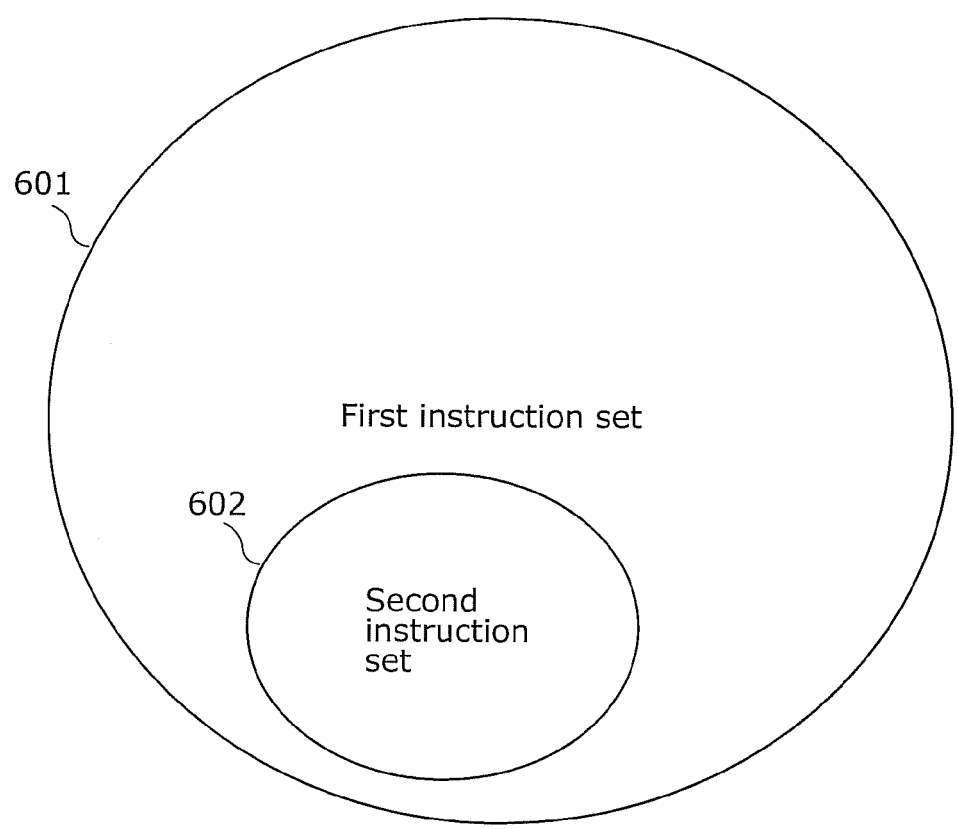
FIG. 2 illustrates an inclusion relation between a first instruction set and a second instruction set.
Figure 3:
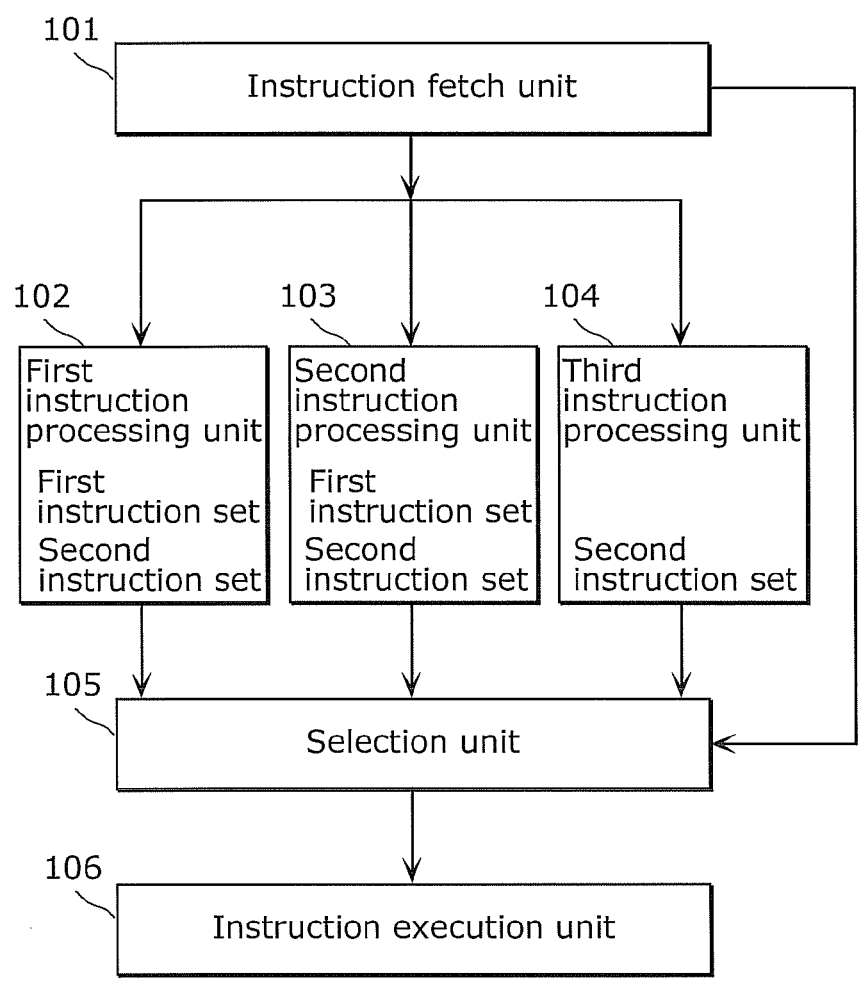
FIG. 3 illustrates relations between instruction processing units and instruction sets.

The following describes relations between the instruction sets illustrated in FIG. 2 and the features of each of the first instruction processing unit 102, the second instruction processing unit 103, and the third instruction processing unit 104. FIG. 3 illustrates these relations.

As FIG. 2 illustrates, the first instruction processing unit 102 can process a first instruction set 601 including all the instructions defined in the processor, and perform complicated control for shortening a processing time. The first instruction processing unit 102 has the highest processing ability among the three instruction processing units. That is, in a first mode, the first instruction processing unit 102 receives a first input including the instructions included in the first instruction set, and schedules and decodes the instructions included in the first input.

As the first instruction processing unit 102, the second instruction processing unit 103 can process the first instruction set 601. However, the second instruction processing unit 103 has a simpler configuration than the first instruction processing unit 102. Thus, the second instruction processing unit 103 has lower processing ability, but can operate with less power. That is, the second instruction processing unit 103 has a simpler configuration than the first instruction processing unit 102. In a second mode, the second instruction processing unit 103 receives the first input, and schedules and decodes the instructions included in the first input. Here, the simple configuration means, for example, less number of circuit components included in the instruction processing unit or smaller circuit size or less number of instructions executable by the instruction processing unit.

As FIG. 2 illustrates, the third instruction processing unit 104 can only process a second instruction set 602 including only part of the instructions included in the first instruction set 601. The third instruction processing unit 104 has a simpler configuration than the first instruction processing unit 102 or the second instruction processing unit 103. Thus, the third instruction processing unit 104 processes limited instructions, but can operate with the least power consumption. That is, the third instruction processing unit 104 has a simpler configuration than the first instruction processing unit 102 or the second instruction processing unit 103. In a third mode, the third instruction processing unit 104 receives a second input including instructions included in the second instruction set, and schedules and decodes the instructions included in the second input.

Because of its features, the first instruction processing unit 102 may have functions such as an out-of-order execution function for executing instructions which are reordered so as not to cause contradiction in a program, concurrent execution of instructions, synthesis of instructions, division of single instruction into more than one instruction, dynamic change of frequency according to a load, speculative execution, and branch prediction. For instance, the first instruction processing unit 102 having the out-of-order execution function schedules and decodes the instructions included in the first input while changing the input order of the instructions.

Because of their features, the second instruction processing unit 103 or the third instruction processing unit 104 may have functions such as an in-order execution function for executing instructions in accordance with the input order of the instructions, and execution of single instruction or concurrent execution of two instructions or so at the most. For instance, the second instruction processing unit 103 having the in-order execution function schedules and decodes the instructions included in the first input, in accordance with the input order of the instructions. Moreover, the third instruction processing unit 104 having the in-order execution function schedules and decodes the instructions included in the second input, in accordance with the input order of the instructions.

Figure 4:
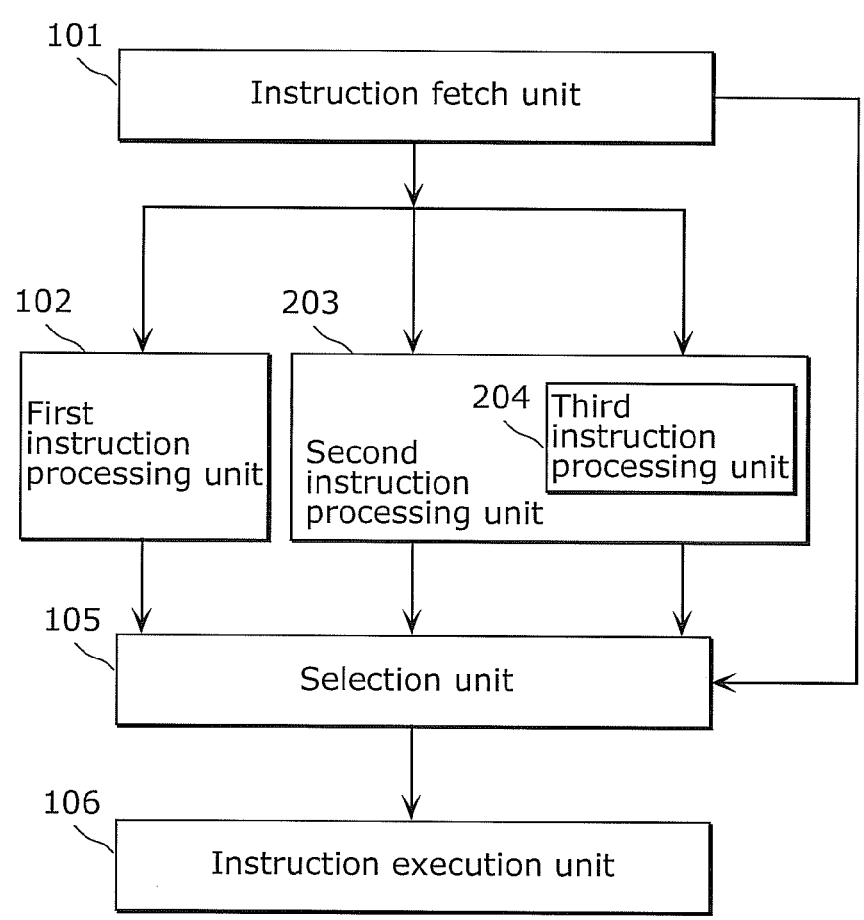
FIG. 4 illustrates another configuration of the processor according to the embodiment.

As FIG. 4 illustrates, a second instruction processing unit 203 may include a third instruction processing unit 204. When the second instruction processing unit 203 operates, the third instruction processing unit 204 may constantly operate. However, when the third instruction processing unit 204 operates, the second instruction processing unit 203 does not have to operate. In this case, the second instruction processing unit 203 may be able to process only the instructions which are included in the first instruction set 601 but not included in the second instruction set 602 Thus, a portion obtained by removing the third instruction processing unit 204 from the second instruction processing unit 203, i.e., a portion which processes the instructions which are included in the first instruction set 601 but not included in the second instruction set 602 may be called a fourth instruction processing unit.

For any of the first instruction processing unit 102, the second instruction processing unit 103, and the third instruction processing unit 104, a balance between performance and a cost can be improved by, for example, dynamically changing an operable speed and setting the upper limit or lower limit of an operation speed suitable for the instruction processing unit, in view of a state in which the instruction processing unit is used.

Figure 5:
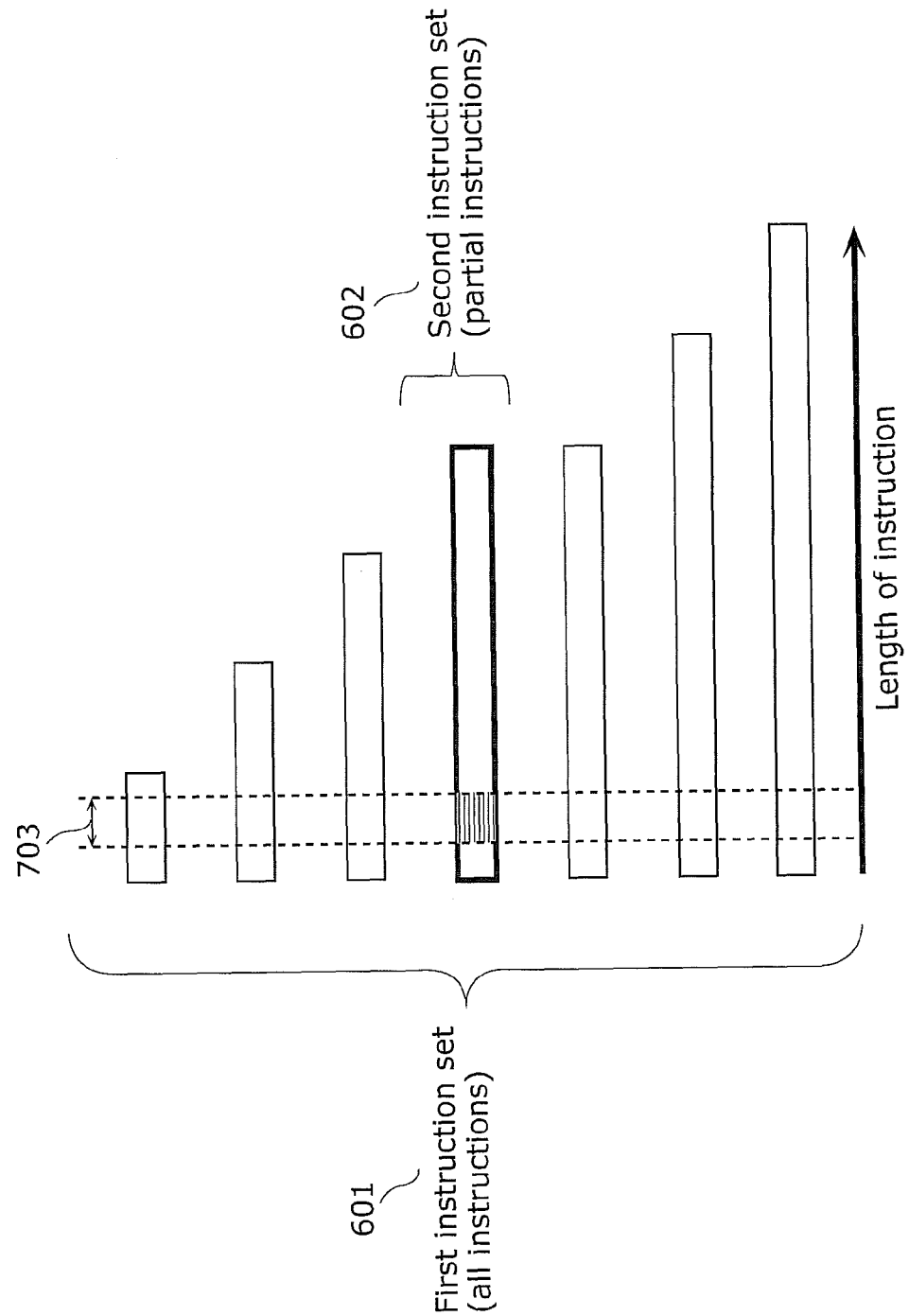
FIG. 5 illustrates a relation in instruction length between the first instruction set and the second instruction set.

As FIG. 5 illustrates, the second instruction set 602 is part of the first instruction set 601, and includes instructions of the same bitmap length (instruction length). Preferably, only a position 703 which occupies a small portion of an instruction bitmap should be able to determine whether an instruction is included in the second instruction set 602. In addition, it is preferable that the second instruction set 602 include instructions which are necessary and sufficient for an operating system or device driver or software such as communication or decryption. For instance, the bitmap length of the position 703 is 1 bit, the bit values of the instructions included in the second instruction set 602 are set to 1, and the bit values of the instructions not included in the second instruction set 602 are set to 0. This can determine whether or not the respective instructions are included in the second instruction set 602.

Moreover, in the state where only the third instruction processing unit 104 (204) is operating, if the instruction fetch unit 101 fetches the instructions which are not included in the second instruction set 602 but included in the first instruction set 601, a mode is switched from the third mode to the second mode, and the second instruction processing unit 103 (203) may be caused to operate. During the mode switching, the instruction fetch processing may be suspended, if necessary, and interrupt handling or other processing may be performed.

Figure 6:
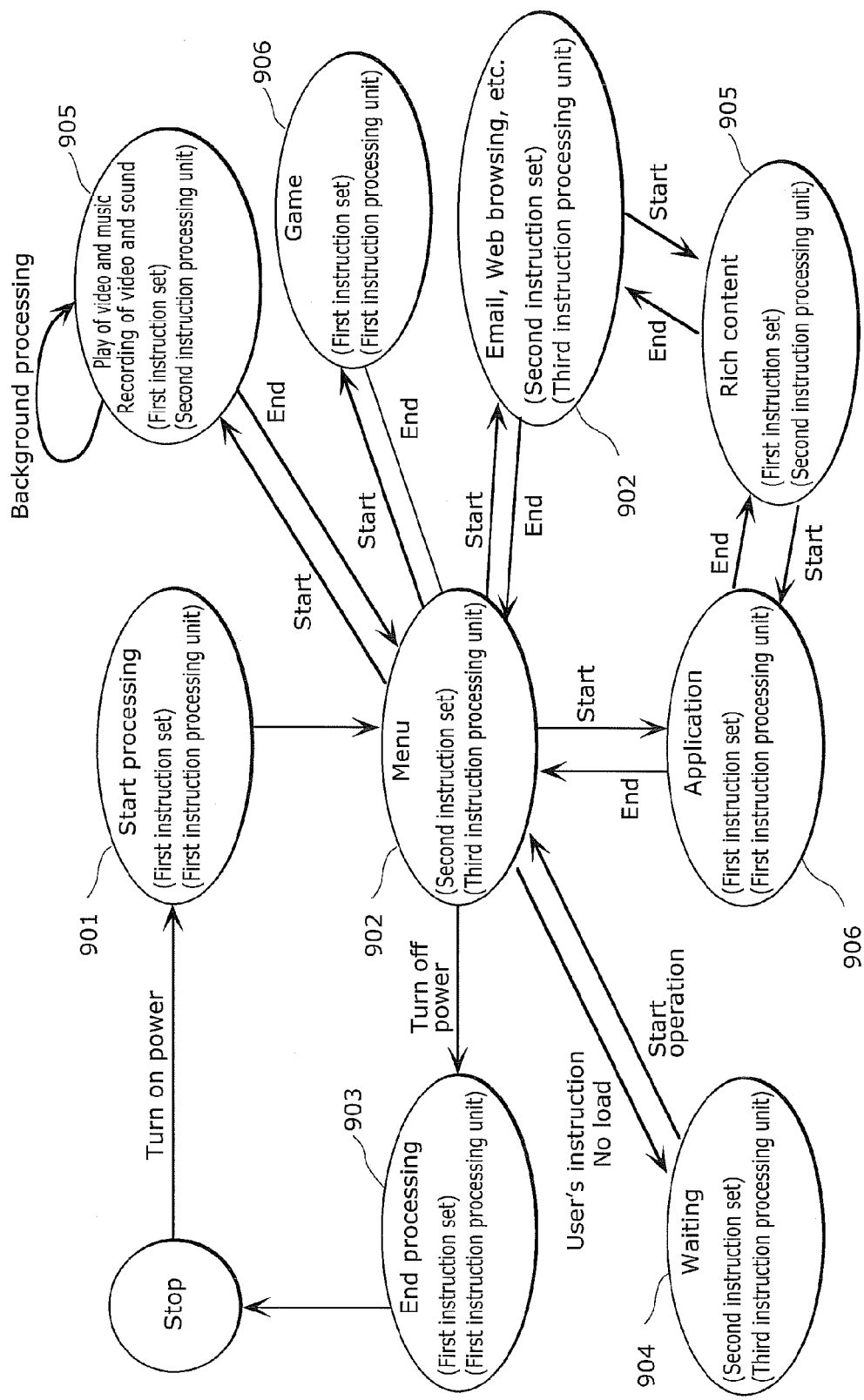
FIG. 6 illustrates the state transition of relations between the instruction processing units and states where programs are used.

As FIG. 6 illustrates, it is assumed that switching between the first instruction processing unit 102, the second instruction processing unit 103, and the third instruction processing unit 104 is mainly performed by user's operation. If necessary, the switching may be performed by software control or by automatically judging the situation. That is, if the processor is in a first state satisfying a predetermined first condition, a mode is automatically switched to the first mode. Moreover, if the processor is in a second state satisfying a predetermined second condition, the mode is automatically switched to the second mode. Furthermore, if the processor is in a third state satisfying a predetermined third condition, the mode is automatically switched to the third mode.

The switching may be performed by interruption triggered by user's operation, or a dedicated instruction for switching may be prepared. That is, the mode switching is written in a program executed by the processor. One of the first instruction processing unit 102, the second instruction processing unit 103, and the third instruction processing unit 104 finishes scheduling and decoding instructions in response to the mode switching written in the program. Another instruction processing unit of the first instruction processing unit 102, the second instruction processing unit 103, and the third instruction processing unit 104 starts scheduling and decoding the instructions in response to the mode switching written in the program. Moreover, in response to the mode switching written in the program, the selection unit 105 switches between results of decoding by the first instruction processing unit 102, the second instruction processing unit 103, and the third instruction processing unit 104 to be selected. It should be noted that the program executed by the processor includes an instruction for the mode switching.

Moreover, the switching may be performed under the following conditions. That is, a program to be executed may be associated in advance with the first mode, the second mode, and the third mode, and when the program is started, the mode switching may be performed in accordance with the association.

Alternatively, a load to be placed on the processor is associated in advance with the first mode, the second mode, and the third mode. The load is monitored. Based on the monitored or a predicted load, the mode switching may be performed in accordance with the association. For instance, a load value may belong to one of at least three ranges. According to which range a load belongs to, the load may be associated with the first mode, the second mode, or the third mode in the descending order of the load value.

Alternatively, the remaining quantity of a battery for supplying power supply to a set in which the processor is installed is associated in advance with the first mode, the second mode, and the third mode. The remaining quantity of the battery is monitored. Based on the monitored or predicted remaining quantity of the battery, the mode switching may be performed in accordance with the association. For instance, the remaining quantity of the battery may belong to one of at least three ranges. According to which range the remaining quantity belongs to, the remaining quantity may be associated with the first mode, the second mode, or the third mode in the descending order of the remaining quantity. Moreover, if an AC adaptor is used, the remaining quantity may be associated with the first mode.

Alternatively, the heating value of the processor itself or the heating value of the set in which the processor is installed may be associated in advance with the first mode, the second mode, and the third mode. The heating value is monitored. Based on the monitored or a predicted heating value, the mode switching may be performed in accordance with the association. For instance, the heating value may belong to one of at least three ranges. According to which range the heating value belongs to, the heating value may be associated with the first mode, the second mode, or the third mode in the descending order of the heating value.

Alternatively, the mode switching may be performed according to combinations of the above conditions.

It should be noted that if the first instruction processing unit 102 and the second instruction processing unit 103 schedule and decode the same instruction, the second instruction processing unit 103 may have a longer execution time, a lower heating value, and a smaller heat generating area than the first instruction processing unit 102. Moreover, if the first instruction processing unit 102 and the third instruction processing unit 104 schedule and decode the same instruction, the third instruction processing unit 104 may have a longer execution time, a lower heating value, and a smaller heat generating area than the first instruction processing unit 102.

It should be noted that in the second mode, the third instruction processing unit 104 may further schedule and decode the instructions included in the second instruction set, out of the instructions included in the first input. In this case, the processor may include the fourth instruction processing unit which, in the second mode, schedules and decodes the instructions not included in the second instruction set, out of the instructions included in the first input. The inclusion of the fourth instruction processing unit allows the third instruction processing unit 104 and the fourth instruction processing unit to perform processing performed by the second instruction processing unit 103, and allows the third instruction processing unit 104 and the fourth instruction processing unit to operate in parallel. That is, the third instruction processing unit 104 and the fourth instruction processing unit can function as the second instruction processing unit 103. It should be noted that the fourth instruction processing unit may process instructions included in a third instruction set. Here, the third instruction set includes the instructions included in the second instruction set and part of the instructions which are included in the first instruction set but not included in the second instruction set.

The operations independently performed by the first instruction processing unit 102, the second instruction processing unit 103, and the third instruction processing unit 104 were described above. Combinations of these instruction processing units can perform simultaneous multithreading. The simultaneous multithreading is a technology for operating programs efficiently by making one processor look as if there were more than one processor, when operating the programs with single processor. In general, the simultaneous multithreading (SMT) is achieved by, for example, including two or more identical instruction processing units or providing single instruction processing unit with two or more parts for managing the procedure of the programs. This can be applied to the instruction processing units described above in the present embodiment. For instance, it is of course possible to achieve the conventional SMT by providing the first instruction processing unit 102 with two or more parts for managing the procedure of the programs. In addition, an asymmetric multithreading system can be achieved by concurrently driving instruction processing units having different features, such as the first instruction processing unit 102 and the second instruction processing unit 103, and by the selection unit 105 dynamically controlling selection of results.

(Software System and Compiler)

The following describes a software system for using a processor.

A source program needs to be compiled using a compiler to build the software system. To make effective use of the features of the processor in the present disclosure, this compiler needs to clearly distinguish compilation using only the second instruction set 602 from compilation using the first instruction set 601.

Figure 7:
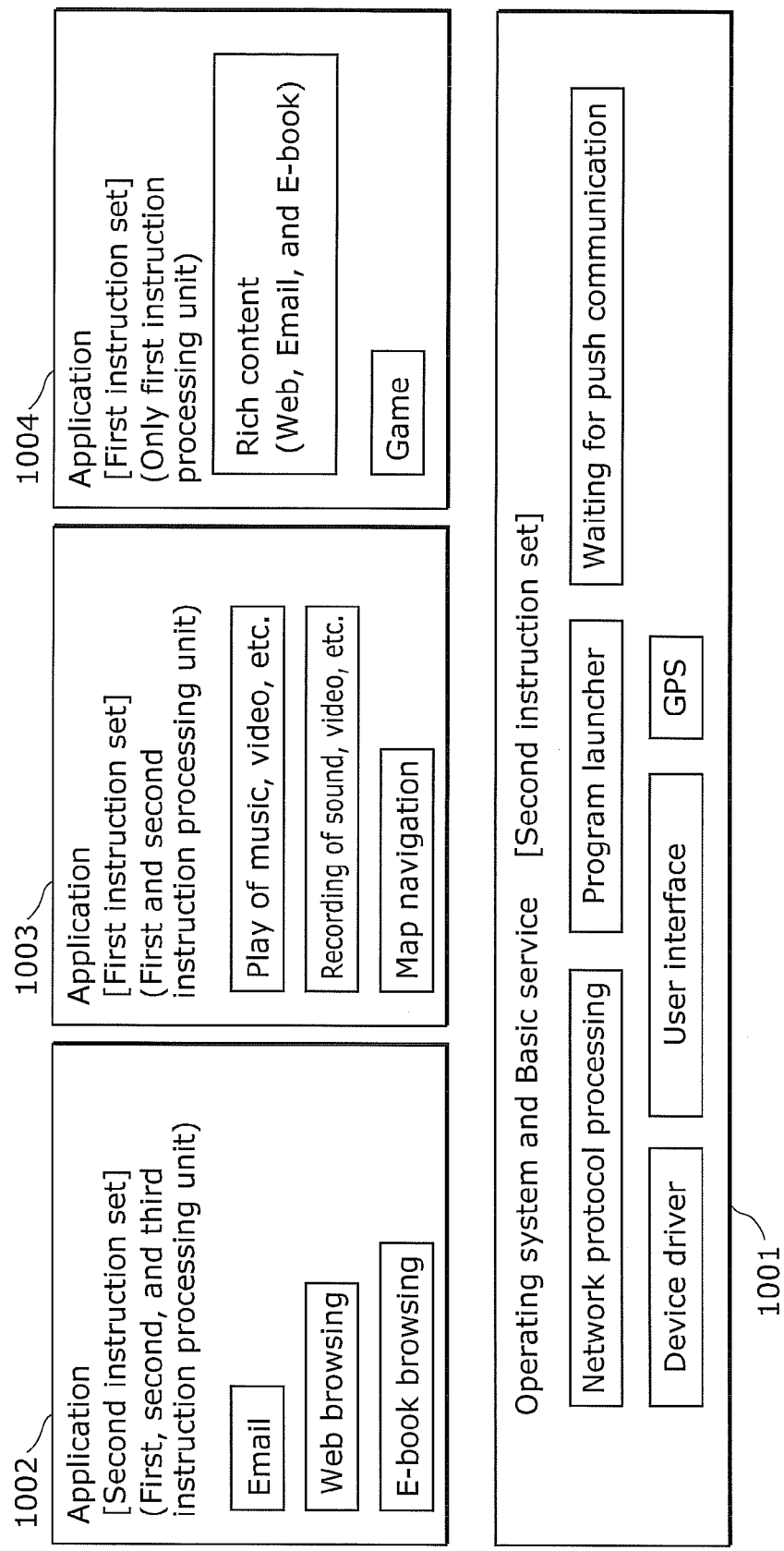
FIG. 7 illustrates relations between types of software and instruction sets.

As FIG. 7 illustrates, in the software system, various kinds of programs are executed by a user, and these programs have different features.

For instance, the software system includes programs 1001 to 1004.

The program 1001 is, for example, an operating system or basic service program which needs to be constantly executed. The program 1001 includes, for example, a network protocol program and a program-launcher program.

The program 1002 is an application program which does not place much load but needs to be executed for a long time. The program 1002 includes, for example, an email program and a web browsing program.

The program 1003 is an application program which constantly places a certain load. The program 1003 includes, for example, a video play program and map navigation program.

The program 1004 is an application program which places a high load because of user's active operation. The program 1004 includes, for example, a Web program which handles rich content and a game program. Thus, the programs making up the software system can be categorized into different groups.

FIG. 6 illustrates the state transition of the processor which executed the programs included in the software system illustrated in FIG. 7. For instance, when the processor is turned on, a program for performing start processing 901 is executed. The program 901 includes the instructions included in the first instruction set, and is processed by the first instruction processing unit 102. When the program 901 ends, a program for performing menu processing 902 is executed. The program 902 includes the instructions included in the second instruction set, and is processed by the third instruction processing unit 104. Here, for example, if the user selects a game on a menu screen, a game program 906 is executed. The program 906 includes the instructions included in the first instruction set, and is processed by the first instruction processing unit 102. When the execution of the program 906 ends, the program 902 is executed again.

Figure 8:
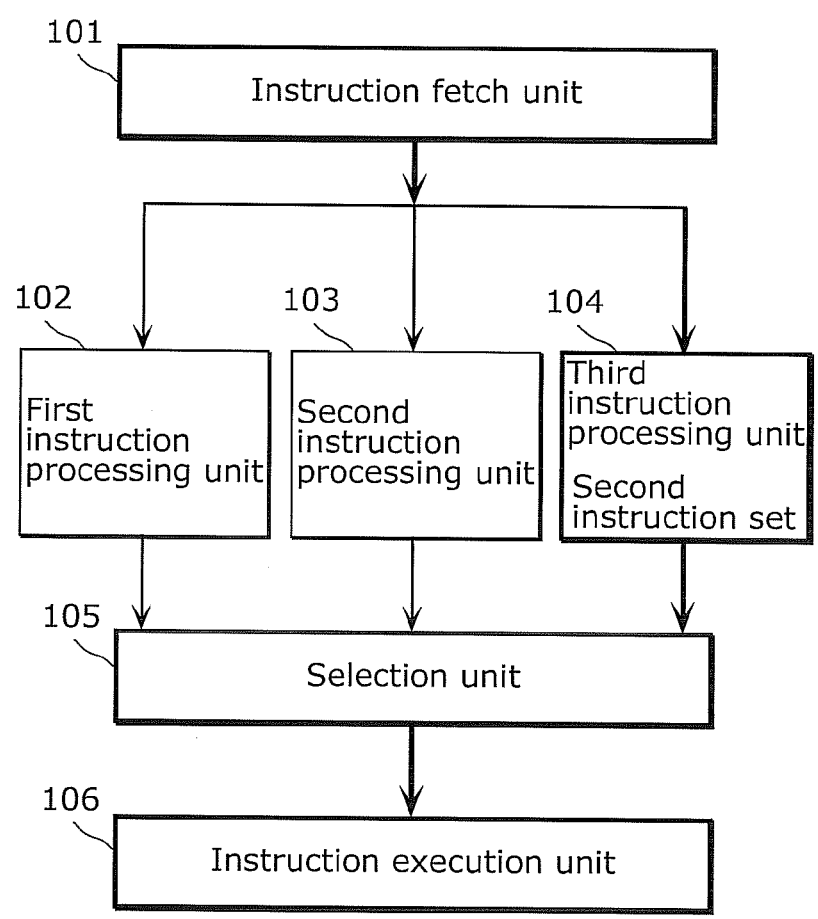
FIG. 8 illustrates the instruction processing units in the state of waiting or menu in FIG. 6.
Figure 9:
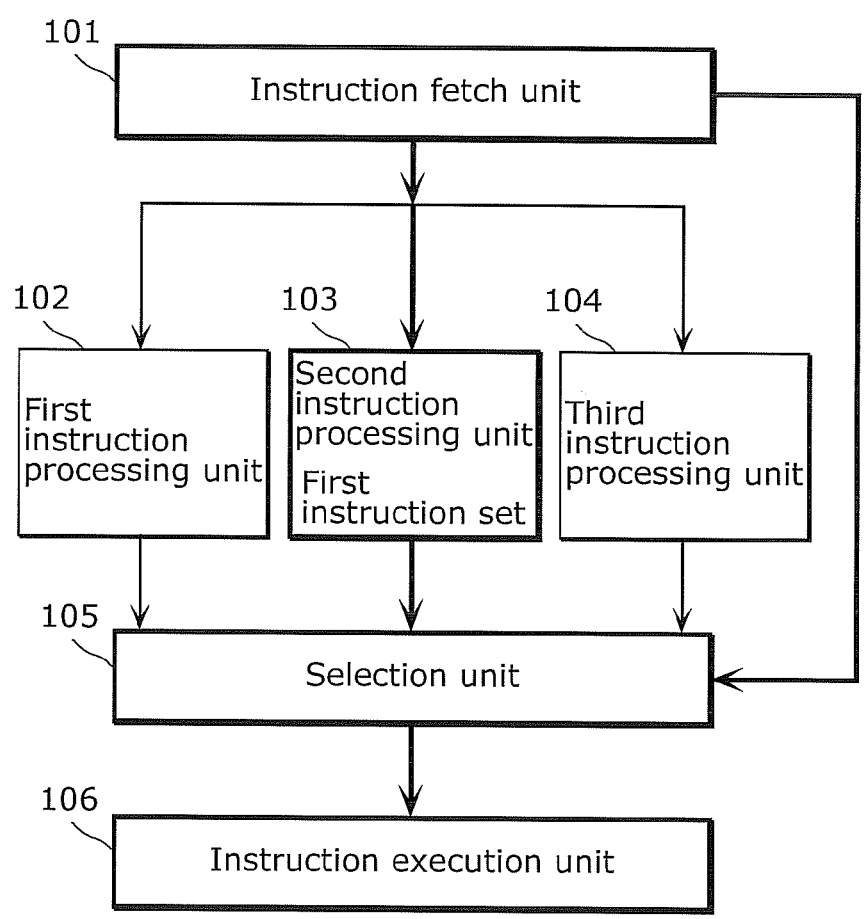
FIG. 9 illustrates the instruction processing units in the state of reproduction of video or music or recording of video or sound in FIG. 6.
Figure 10:
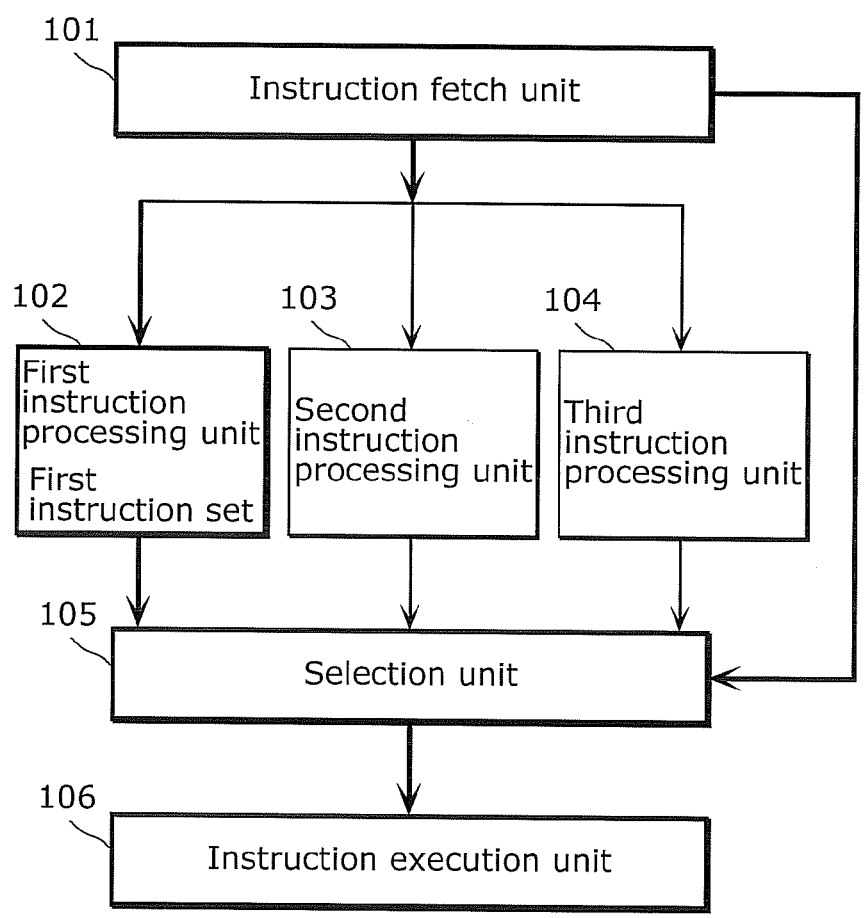
FIG. 10 illustrates the instruction processing units when a game or rich content in FIG. 6 is used.

To make effective use of the features of the processor, programs 901, 903, 904, 1001 in constant operation such as a communication waiting program in, for example, the operating system, telephone program, or email program or the programs 902, 1001, and 1002 which require easy operations may include only the second instruction set 602. In this case, as FIG. 8 illustrates, these programs may be processed by only the third instruction processing unit 104. The programs 905 and 1003 which continue to place a certain load for a certain time, such as a program for reproducing music or video may include the first instruction set 601. As FIG. 9 illustrates, the programs 905 and 1003 may be processed by the second instruction processing unit 103. The programs 906 and 1004 which place a high load, such as a game may include the first instruction set 601. As FIG. 10 illustrates, the programs 906 and 1004 may be processed by the first instruction processing unit 102.

Here, there may be an instruction set other than the two kinds of instruction sets, i.e., the first instruction set 601 and the second instruction set 602. For example, an instruction set obtained by adding, to the second instruction set 602, an instruction suitable for reproducing music or video which is included in the first instruction set 601 may be defined as a third instruction set. A compiler may be designed so that the programs include the third instruction set. The programs including the third instruction set may be processed by the fourth instruction processing unit which is different from the first instruction processing unit 102 to the third instruction processing unit 104 and not illustrated in the figure.

It should be noted that the software system may have the following configuration. That is, the software system may include at least one of a first program and a second program, a third program, and a fourth program. The first program is executed by the processor in the first mode. The second program is executed by the processor in the second mode. The third program is executed by the processor in the third mode. The fourth mode controls switching between the first program, the second program, and the third program to be executed. Here, the switching is performed following mode switching. The fourth program is executed by the processor in the third mode. That is, the fourth program switches between other programs to be executed. Each program is executed on the processor. Thus, necessary performance and functions can be achieved with less power and at a lower cost.

A compiler which creates the program system described above is a program for creating, from a source program, a machine program to be executed by the processor. An instruction indicating which of the first mode, the second mode, and the third mode the processor is operated in is written in the source program.

If the instruction indicates that the processor should be operated in the first mode, the compiler creates a machine program for causing the first instruction processing unit 102 to schedule and decode the instructions included in the first instruction set. That is, the first instruction processing unit 102 is suitable for processing, for example, a program which requires high-speed processing on a complicated instruction or a program which requires an instruction processing unit whose performance is high or drastically changes. Thus, if the instruction indicates that the processor should be operated in the first mode, the compiler creates a machine program including the instructions of the first instruction set processed by the first instruction processing unit 102.

Moreover, if the instruction indicates that the processor should be operated in the second mode, the compiler creates a machine program for causing the second instruction processing unit 103 to schedule and decode the instructions included in the first instruction set. That is, the second instruction processing unit 103 is suitable for processing a program which requires moderately-complicated processing but continuously runs with a relatively small load or a program used for user's simple operation. Thus, if the instruction indicates that the processor should be operated in the second mode, the compiler creates a machine program including the instructions of the first instruction set processed by the second instruction processing unit 103.

Furthermore, if the instruction indicates that the processor should be operated in the third mode, the compiler creates a machine program for causing the third instruction processing unit 104 to schedule and decode the instructions included in the second instruction set. That is, the third instruction processing unit 104 is suitable for processing a program which requires the largest reduction in power consumption, i.e., a program constantly running even in a waiting state. Thus, if the instruction indicates that the processor should be operated in the third mode, the compiler creates a machine program including the instructions of the second instruction set processed by the third instruction processing unit 104.

It should be noted that these instructions may be specified for each program or for each function included in the program. Moreover, such specification may be written in a header file which is read during compilation or may be written in the program as a pragma directive.

A computer system using the above processor and software system will be described below.

Figure 11:
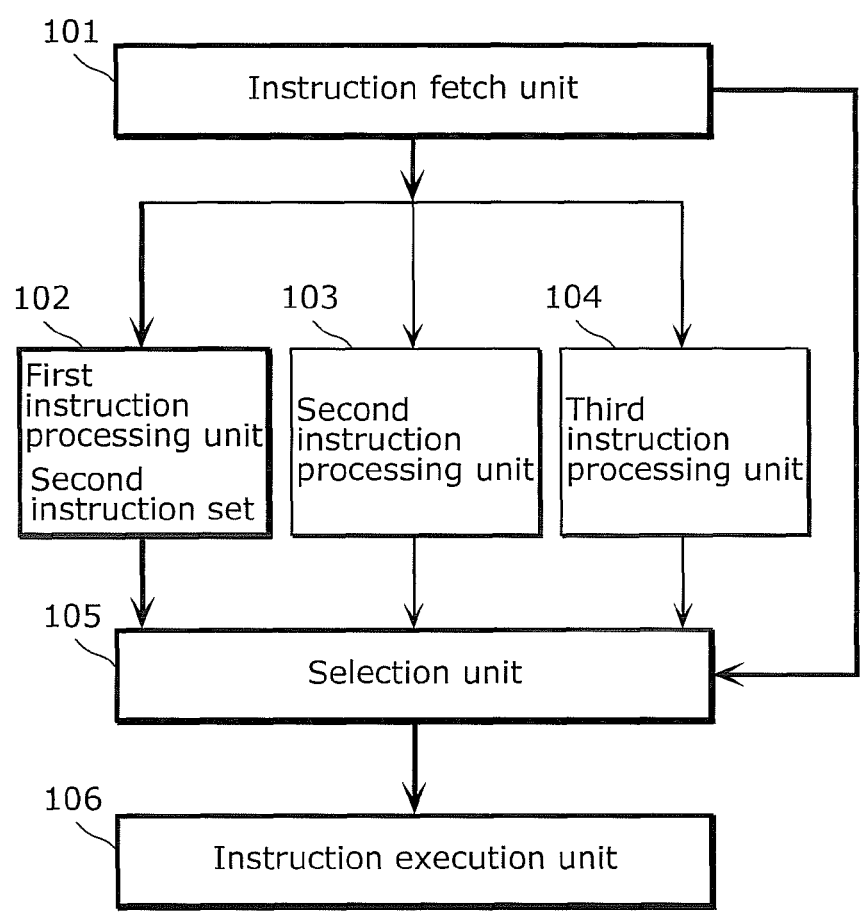
FIG. 11 illustrates the instruction processing units in the state of start processing or end processing in FIG. 6.
Figure 12:
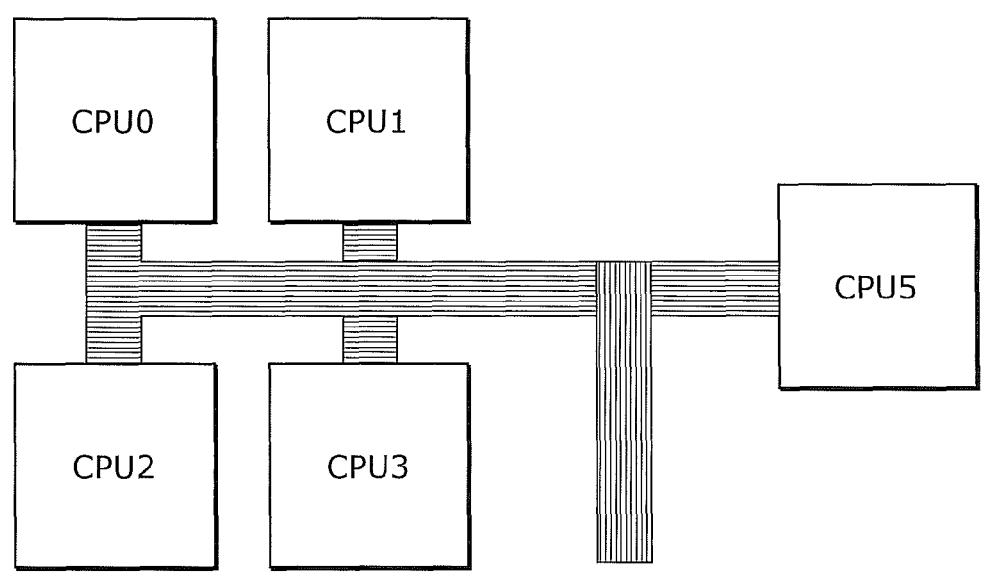
FIG. 12 illustrates a configuration example of a processor including a conventional high-performance processor and a processor which can be operated with low power consumption.
Figure 13:
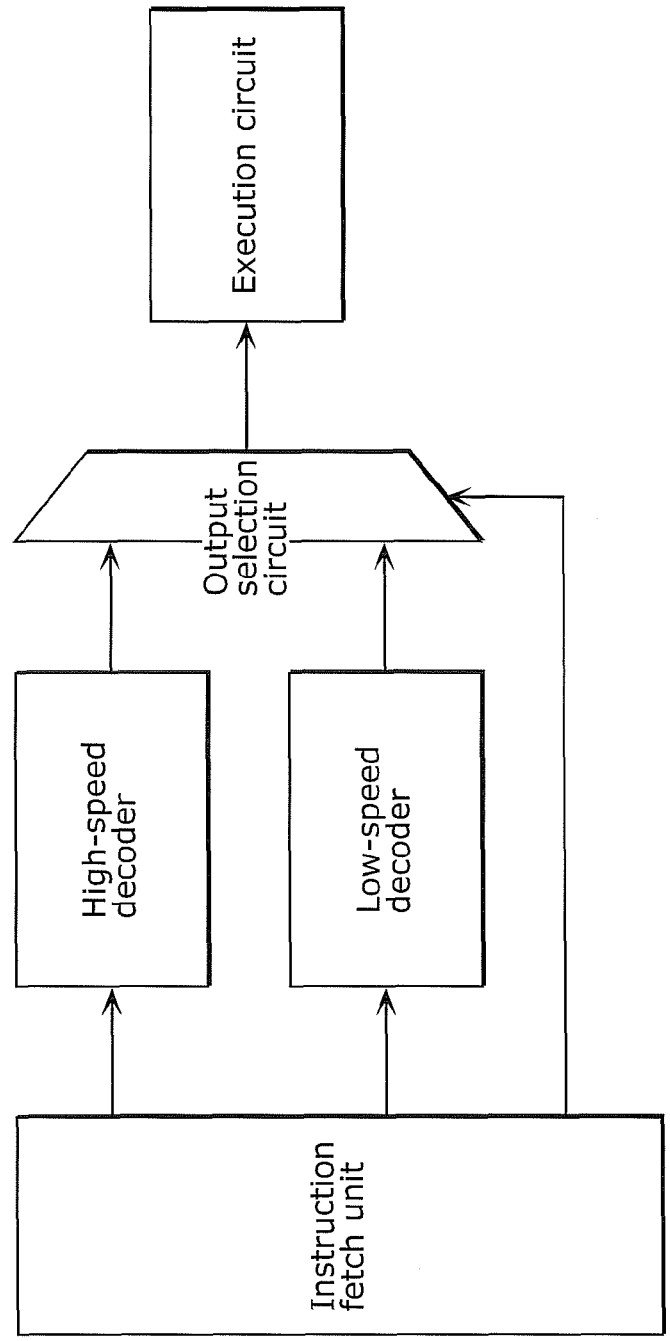
FIG. 13 illustrates the configuration of a processor disclosed in Patent Literature 1.
Figure 14:
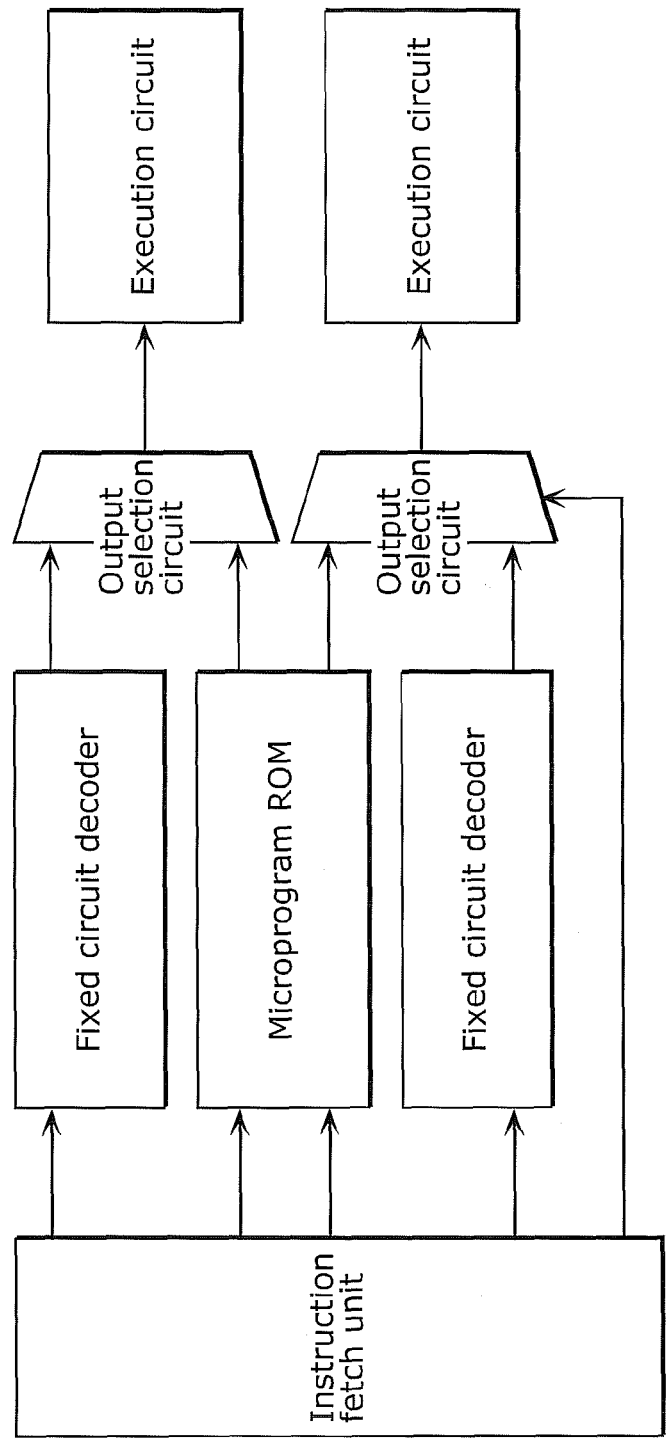
FIG. 14 illustrates the configuration of a processor disclosed in Patent Literature 2.

It should be noted that combinations of the instruction sets and the instruction processing units are not limited to the above combinations. For instance, when initiating or terminating the device, only the program 1001, which needs to be constantly executed, is executed to complete a large amount of start processing or end processing as fast as possible, in many cases. Thus, as FIG. 11 illustrates, the first instruction processing unit 102 may process the program 1001 including the second instruction set 602.

(Cellular Phone, Smart Phone, Tablet, and Car Navigation System)

The computer system has a state in which a user actively performs an operation and a state in which the user does not perform an operation but the system waits for an operation. Such computer system can include, for example, a system LSI and software for a cellular phone.

The computer system includes at least the above processor and software system.

Terminals which can be possessed by individuals, such as cellular phones, smartphones, or tablet terminals are used in various situations such as making a voice call, making a videophone call, sending and receiving an email or message, receiving a news flash, checking a map or operating a car navigation system using a GPS, reproducing music or video, recording a sound, photograph, or video, browsing the web, playing a game, and reading.

Among the functions used in these situations, voice communication, videophone, sending and receiving of an email or message, and a news flash are functions constantly running waiting functions. That is, since requests may be sent to terminals via networks, these functions have roles to constantly monitor whether or not such requests are sent and notify a user as soon as the requests are sent.

These functions and an operating system itself which is base software for supporting these functions do not require a complicated instruction, but needs to be continuously operated for a very long time, and needs to be continuously operated for a longer time period in view of convenience for users.

In the program for achieving these functions, the part of processing which operates also during a waiting time and notifies a user of information may be formed with only the second instruction set 602, using the compiler described above. Moreover, the compiler creates a program such that a processing instruction during a waiting time is processed by the third instruction processing unit 104 and other instruction is processed by the third instruction processing unit 104 or the second instruction processing unit 103. Thus, processing during a waiting time can be performed with less power.

Moreover, as during a videophone or when video news is played back after a news flash is received, processing used when the user operates a terminal after the user is notified of information is more complicated than the processing during the waiting time, and may require higher performance during execution. Thus, the compiler creates a program such that such processing part of the program includes the first instruction set 601 and is processed by the second instruction processing unit 103 or the first instruction processing unit 102. It should be noted that the compiler may create a program such that a processing part such as voice communication, transmission and reception of an email or message, display of only characters after receiving a news flash includes only the second instruction set 602 and is processed by the third instruction processing unit 104.

When processing such as reproducing music or video, recording a sound, photograph, or video, or checking a map or operating a car navigation system using a GPS is performed, a user does not actively operate a terminal, but execution of moderately complicated processing and moderately high performance are required for a terminal.

Thus, the compiler creates a program as described below. Such processing part includes the first instruction set 601, and is basically processed by the second instruction processing unit 103. If the processing part is concurrently used with other software and is operated in a background, as reproduction of music, the processing part is processed by the first instruction processing unit 102.

Moreover, when processing such as recording or play of a video is performed, the amount of processing increases due to a resolution or others. This may result in too slow processing by the second instruction processing unit 103. In this case, the first instruction processing unit 102 can be used instead of the second instruction processing unit 103.

Moreover, when processing such as checking a map or using a car navigation system is processed, positional information needs to be obtained while turning off a screen display when the user does not look at a screen. Thus, the compiler creates a program such that the processing part includes the second instruction set 602 and is processed by only the third instruction processing unit 104. This can further reduce power consumption.

Moreover, when processing such as browsing a web, playing a game, or reading is performed, the user actively operates a device. Thus, execution of complicated processing and high performance are sometimes required, and necessary performance may significantly vary depending on user's operation. To achieve such processing, the compiler creates a program such that the processing part which requires network waiting includes only the second instruction set 602 and is processed by only the third instruction processing unit 104. Moreover, the compiler creates a program such that the processing part which the user actively operates includes the first instruction set 601 and is processed by the second instruction processing unit 103 or the first instruction processing unit 102 according to a change in required performance in response to user's operation.

If the compiler gives a program previous information indicating which instruction processing unit can process the program, the processor can perform an operation more suitable for a state in which the device is used.

(AV Equipment Such as Television and Video Equipment)

The computer system can be used when the user does not actively operate the equipment but waiting is constantly performed. Moreover, the computer system can be achieved by combining a television, a video recording device, a system LSI, a processor, and software in which a sound or video is continuously played or recorded for a long time.

A terminal as placed in each room, such as a television or a video recording device is used in various applications other than simply displaying or recording a video or sound. For instance, such terminal is used when reproducing or recording music or video in a television program or the like, displaying a program list, reserving recording, displaying photographs, playing a game, making a videophone call.

When a TV program is displayed or recorded by these devices, a processor controls, as its main roles, a special function for displaying or playing a video or a memory. Thus, high performance is not required, and complicated processing is not much required, either.

Thus, in this case, the compiler creates a program for achieving these functions, with only the second instruction set 602. The compiler creates the program as described below. When only the above processing is performed, an instruction is processed by the third instruction processing unit 104. When the above processing is performed in parallel with other processing or in other case, an instruction is processed by the first instruction processing unit 102. This can achieve a better balance between less power consumption and performance by the processor.

Reproduction of music may be processed by a processor. In this case, the compiler creates a program including the instructions included in the first instruction set 601. Moreover, the compiler creates a program as described below. When a television program is only displayed or recorded, the second instruction processing unit 103 processes an instruction. When the above display processing or recording processing is performed in parallel with other processing or in other case, the first instruction processing unit 102 processes an instruction.

(Digital Still Camera and Digital Video Camera)

The computer system can be used in cameras or the like which have not often been connected to networks.

A device such as a digital still camera or a digital video camera has a function for transferring data representing a moving image or static image to a cloud network or home network, using a wireless network such as WiFi (registered trademark), during the time when the user does not use the device Here, these devices only need to connect to the network and transfer data. Thus, the compiler creates a program which includes only the instructions included in the second instruction set 602. The compiler creates a program as described below. When only the above processing is performed, the third instruction processing unit 104 processes an instruction. When the user performs other processing, the first instruction processing unit 102 or the second instruction processing unit 103 processes an instruction.

In many cases, special functions would be used for capturing a moving image or a static image in these devices. Thus, the compiler may create a program for controlling these functions, with only the instructions included in the second instruction set 602.

In these devices, processing such as a change in resolution or a correction to an effect on the image due to recognition of a photographing object or outside environment may be performed on a captured moving image and static image. In this case, moderately complicated processing and moderately high performance may be necessary. Thus, the compiler may create a program including the instructions of the first instruction set 601 such that the first instruction processing unit 102 or the second instruction processing unit 103 processes an instruction according to required performance.

(Personal Computer and Home Server)

A computer system can be used for various kinds of personal computers (hereinafter, referred to as PC) such as a desktop PC, a notebook-sized PC, and a tablet PC.

Conventional PCs are generally turned off when not in use. However, it is expected to become common that PCs are used like home servers which are constantly connected to the Internet and operated so as to perform processing in response to a request from a network.

Also in these PCs and home servers, necessary functions and performance change more dynamically than ever before, depending on a situation. Thus, if a program for achieving basic software or a basic service includes only the instructions of the second instruction set 602 and only the instructions are executed, the compiler described above creates, for example, a program for causing the third instruction processing unit to process the instructions. Moreover, the compiler creates a program for achieving processing involving user's active operation on a PC or special processing, with the instructions of the first instruction set 601. The compiler causes the first instruction processing unit 102 to process the instructions to concurrently operate this program and the program for achieving basic software or basic service. This can achieve a better balance between power consumption and performance.

As described above, according to the present embodiment, the first instruction processing unit 102, the second instruction processing unit 103, and the third instruction processing unit 104 have configurations described above. That is, the first instruction processing unit 102 is a performance-oriented instruction processing unit as installed in a conventional high-performance processor, and can process all the instructions defined as the first instruction set. Moreover, the first instruction processing unit 102 can perform complicated processing such as changing the order of instructions (out of order) and processing more than one instruction in parallel for higher performance, and can operate at a high speed. Moreover, the second instruction processing unit 103 can process all the instructions included in the first instruction set. Meanwhile, the second instruction processing unit 103 has a simpler configuration than the first instruction processing unit 102, and is suitable for an operation at a relatively low speed. Moreover, the third instruction processing unit 104 can process only the instructions which are defined as the second instruction set and always necessary as part of the first instruction set. Moreover, the third instruction processing unit 104 has a simpler configuration than the first instruction processing unit 102, and aims at a reduction in power consumption by operating at a relatively low speed. Inclusion of the third instruction processing unit 104 in the processor can achieve necessary performance and functions with less power and at a lower cost. It should be noted that there may be an instruction processing unit other than the three types of instruction processing units. There may be the fourth and following instruction processing units.

Moreover, the out-of-order processing by the first instruction processing unit 102 improves the performance of the processor. Moreover, in-order processing by the second and third instruction processing units 103 and 104 allows the processor to operate with low power consumption.

Moreover, a circuit for achieving decoding processing by the third instruction processing unit 104 can have a simple configuration by making the instructions included in the second instruction set have the same length. This allows the third instruction processing unit 104 to operate with low power consumption. It should be noted that more preferably, the lengths of the instructions included in the second instruction set should be defined to be as short as possible.

Moreover, inclusion of a power supply control mechanism in the processor can avoid power supply or clock supply to an instruction processing unit which is not performing processing. This can reduce power consumption by the processor.

Moreover, by executing a machine program created by the compiler, the processor described above can drive one of the instruction processing units, in accordance with a mode indicated by an instruction specified in a source program. This can achieve necessary performance and functions with less power and at a lower cost.

Moreover, each program is executed on the processor described above. This can achieve necessary performance and functions with less power and at a lower cost.

Use of the instruction processing units and software system described above can achieve minimum required performance with less power than before. Furthermore, even if higher performance is necessary, satisfactory performance can be achieved.

Moreover, it is possible to operate constantly-operating software, using a circuit which can perform an appropriate operation by user's operation or according to a situation, thereby significantly reducing a necessary additional cost.

Moreover, there is no need to share the instruction execution unit or copy a circuit involved in interrupt handling or others. This enables small degradation in performance and allows the same processor to process without interrupting constantly-operating software. Thus, overhead in terms of time necessary for returning to a high-speed operation becomes extremely small.

Thus, a more appropriate balance between performance and power can be achieved at a very small additional cost. This enables to create digital equipment which can be used more comfortably for a long time.

It should be noted that the present disclosure is not limited to the above embodiment.

For instance, the present disclosure can be achieved as a multiprocessor system including more than one processor described above. To operate this multiprocessor system, mode switching is written in a program executed by the processors. The multiprocessor system changes the number of processors to be operated or the operation speed of each processor, according to the mode switching written in the program. For each processor, one of the first instruction processing unit 102, the second instruction processing unit 103, and the third instruction processing unit 104 finishes scheduling and decoding instructions, and another instruction processing unit of the first instruction processing unit 102, the second instruction processing unit 103, and the third instruction processing unit 104 starts scheduling and decoding instructions. Moreover, the selection unit 105 of each processor switches results of decoding by the first instruction processing unit 102, the second instruction processing unit 103, and the third instruction processing unit 104 to be selected, according to the mode switching written in the program. Inclusion of the above processor allows this multiprocessor to achieve effects and advantages similar to those of the above processor.

Moreover, the present disclosure can be achieved as a memory control system. The memory control system is used by the above processor. The memory control system operates as a cash memory in the first mode, and includes a memory device which operates as a main memory device in the third mode. Moreover, if a mode is switched to the first mode or third mode, the memory control system further includes a control mechanism which transfers data stored in the memory device to another memory device. Thus, the memory device operates as the cash memory in the first mode, thereby allowing the memory device to operate at a high speed. Moreover, the memory device operates as the main memory device in the third mode, thereby allowing the memory device to operate with low power consumption. This can achieve necessary performance and functions with less power and at a lower cost.

Although only some exemplary embodiments of the present invention have been described in detail above, those skilled in the art will readily appreciate that many modifications are possible in the exemplary embodiments without materially departing from the novel teachings and advantages of the present invention. Accordingly, all such modifications are intended to be included within the scope of the present invention.

INDUSTRIAL APPLICABILITY

The processor and software system according to the present disclosure are useful in application to devices which need to be constantly connected to a network such as the Internet and constantly operated with minimum power consumption, and can perform a high-speed operation if necessary. Such devices include, for example, portable equipment such as a cellular phone and a tablet terminal, a car navigation system, a television, and a video recording and playback device. Moreover, every possible device is expected to be connected to the Internet and constantly operated in the future. Thus, the processor and software system according to the present disclosure are useful for various devices such as a digital camera, a personal computer, and a homer server.

The invention claimed is:

1. A processor comprising:
a first instruction processing unit configured to, in a first mode, receive a first input including instructions included in a first instruction set, and schedule and decode the instructions included in the first input;
a second instruction processing unit configured to, in a second mode, receive the first input, and schedule and decode the instructions included in the first input, the second instruction processing unit having a simpler configuration than the first instruction processing unit;
a third instruction processing unit configured to, in a third mode, receive a second input including instructions included in a second instruction set, and schedule and decode the instructions included in the second input, the second instruction set including part of the instructions included in the first instruction set, the third instruction processing unit having a simpler configuration than the first instruction processing unit and the second instruction processing unit;
a selection unit configured to select, according to a mode, one of results of decoding by the first instruction processing unit, the second instruction processing unit, and the third instruction processing unit; and
an instruction execution unit configured to execute an instruction according to the one of results of decoding selected by the selection unit,
wherein the first instruction processing unit is configured to schedule and decode the instructions included in the first input while changing an input order of the instructions,
the second instruction processing unit is configured to schedule and decode the instructions included in the first input, in accordance with the input order, and
the third instruction processing unit is configured to schedule and decode the instructions included in the second input, in accordance with an input order of the instructions.

2. The processor according to claim 1, wherein if the first instruction processing unit and the second instruction processing unit schedule and decode a same instruction, the second instruction processing unit has a longer decoding time, a lower heating value, and a smaller heat generating area than the first instruction processing unit.

3. The processor according to claim 1, wherein if the first instruction processing unit and the third instruction processing unit schedule and decode a same instruction, the third instruction processing unit has a longer decoding time, a lower heating value, and a smaller heat generating area than the first instruction processing unit.

4. A processor comprising:
a first instruction processing unit configured to, in a first mode, receive a first input including instructions included in a first instruction set, and schedule and decode the instructions included in the first input;

a second instruction processing unit configured to, in a second mode, receive the first input, and schedule and decode the instructions included in the first input, the second instruction processing unit having a simpler configuration than the first instruction processing unit;

a third instruction processing unit configured to, in a third mode, receive a second input including instructions included in a second instruction set, and schedule and decode the instructions included in the second input, the second instruction set including part of the instructions included in the first instruction set, the third instruction processing unit having a simpler configuration than the first instruction processing unit and the second instruction processing unit;

a selection unit configured to select, according to a mode, one of results of decoding by the first instruction processing unit, the second instruction processing unit, and the third instruction processing unit; and an instruction execution unit configured to execute an instruction according to the one of results of decoding selected by the selection unit, wherein the third instruction processing unit is further configured to schedule and decode, in the second mode, the instructions included in the second instruction set, out of the instructions included in the first input, the processor further comprising:

a fourth instruction processing unit configured to schedule and decode, in the second mode, instructions not included in the second instruction set, out of the instructions included in the first input.

5. The processor according to claim 1, wherein all the instructions included in the second instruction set have a same length.

6. The processor according to claim 1,
wherein mode switching is written in a program executed by the processor, one of the first instruction processing unit, the second instruction processing unit, and the third instruction processing unit is configured to finish scheduling and decoding instructions according to the mode switching written in the program, an other instruction processing unit of the first instruction processing unit, the second instruction processing unit, and the third instruction processing unit is configured to start scheduling and decoding instructions according to the mode switching written in the program, and the selection unit is configured to switch between results of decoding to be selected, according to the mode switching written in the program, the decoding being performed by the first instruction processing unit, the second instruction processing unit, and the third instruction processing unit.

7. The processor according to claim 6, wherein the program executed by the processor includes an instruction for the mode switching.

8. The processor according to claim 1,
wherein if the processor is in a first state satisfying a predetermined first condition, a mode is automatically switched to the first mode, if the processor is in a second state satisfying a predetermined second condition, the mode is automatically switched to the second mode, and if the processor is in a third state satisfying a predetermined third condition, the mode is automatically switched to the third mode.

9. The processor according to claim 1, wherein in a state where only the third instruction processing unit is being operated, if an instruction not included in the second instruction set, out of the instructions included in the first instruction set is inputted, a mode is switched to the second mode, and the second instruction processing unit is configured to schedule and decode the inputted instruction.

10. The processor according to claim 1, further comprising:

a power supply control mechanism which, during mode switching, interrupts power supply or clock supply to an instruction processing unit which finishes scheduling and decoding instructions, among the first instruction processing unit, the second instruction processing unit, and the third instruction processing unit, and starts power supply or clock supply to an instruction processing unit which starts scheduling and decoding instructions, among the first instruction processing unit, the second instruction processing unit, and the third instruction processing unit.

11. A processor comprising:

a first instruction processing unit configured to, in a first mode, receive a first input including instructions included in a first instruction set, and schedule and decode the instructions included in the first input;

a second instruction processing unit configured to, in a second mode, receive the first input, and schedule and decode the instructions included in the first input, the second instruction processing unit having a simpler configuration than the first instruction processing unit;

a third instruction processing unit configured to, in a third mode, receive a second input including instructions included in a second instruction set, and schedule and decode the instructions included in the second input, the second instruction set including part of the instructions included in the first instruction set, the third instruction processing unit having a simpler configuration than the first instruction processing unit and the second instruction processing unit;

a selection unit configured to select, according to a mode, one of results of decoding by the first instruction processing unit, the second instruction processing unit, and the third instruction processing unit; and an instruction execution unit configured to execute an instruction according to the one of results of decoding selected by the selection unit, wherein in a fourth mode, the processor receives a plurality of inputs each including the first input or the second input, and output each of the received plurality of inputs to one of the first instruction processing unit, the second instruction processing unit, and the third instruction processing unit, independently of mode switching written in a program executed by the processor.

12. The processor according to claim 11, wherein if the processor is in a state satisfying a predetermined particular condition, a mode is automatically switched to the fourth mode.

13. A multiprocessor system comprising:

a plurality of the processors according to claim 1,
wherein mode switching is written in a program executed by the plurality of the processors, a total number of processors to be operated or an operation speed of each of the plurality of the processors is changed according to the mode switching written in the program, and for each processor, one of the first instruction processing unit, the second instruction processing unit, and the third instruction processing unit is configured to finish scheduling and decoding instructions, and an other instruction processing unit of the first instruction processing unit, the second instruction processing unit, and the third instruction processing unit is configured to start scheduling and decoding instructions, and the selection unit of the processor is configured to switch between results of decoding to be selected, according to the mode switching written in the program, the decoding being performed by the first instruction processing unit, the second instruction processing unit, and the third instruction processing unit.

14. A compiler for creating, from a source program, a machine program executed by the processor according to claim 1, wherein an instruction indicating which mode of the first mode, the second mode, and the third mode the processor is operated in is written in the source program, if the instruction indicates that the processor is operated in the first mode, the compiler creates the machine program for causing the first instruction processing unit to schedule and decode instructions included in the first instruction set, if the instruction indicates that the processor is operated in the second mode, the compiler creates the machine program for causing the second instruction processing unit to schedule and decode the instructions included in the first instruction set, and if the instruction indicates that the processor is operated in the third mode, the compiler creates the machine program for causing the third instruction processing unit to schedule and decode instructions included in the second instruction set.

15. A non-transitory computer-readable recording medium having stored thereon a program to be executed by the processor according to claim 1, the program comprising:

at least one of a first program and a second program, the first program being executed by the processor in the first mode, the second program being executed by the processor in the second mode;

a third program executed by the processor in the third mode; and a fourth program executed by the processor in the third mode, the fourth program controlling switching between the first program, the second program, and the third program to be executed, the switching being performed in response to mode switching.

16. The non-transitory computer-readable recording medium according to claim 15, wherein the processor executes each program included in a software system, in the first mode, at least the first instruction processing unit is configured to schedule and decode instructions included in the first program, in the second mode, at least the second instruction processing unit is configured to schedule and decode instructions included in the second program, and in the third mode, at least the third instruction processing unit is configured to schedule and decode instructions included in the third program.

17. A computer system comprising the processor according to claim 11, wherein the processor executes at least one of a first program and a second program, a third program, and a fourth program, the processor executes the first program in the first mode, the processor executes the second program in the second mode, the processor executes the third program in the third mode, the processor executes the fourth program in the third mode, the fourth program controlling switching between the first program, the second program, and the third program to be executed, the switching being performed in response to mode switching, in the first mode, at least the first instruction processing unit is configured to schedule and decode instructions included in the first program, in the second mode, at least the second instruction processing unit is configured to schedule and decode instructions included in the second program, and in the third mode, at least the third instruction processing unit is configured to schedule and decode instructions included in the third program, and in the fourth mode, at least two or more of the first instruction processing unit, the second instruction processing unit, and the third instruction processing unit are configured to concurrently schedule and decode instructions included in two or more of the first program, the second program, and the third program.

18. A non-transitory computer-readable recording medium having stored thereon a program to be executed by the processor according to claim 11, the program comprising:

a fourth program executed in any of four modes: the first mode, the second mode, the third mode, and the fourth mode, the fourth program controlling switching between the first program, the second program, and the third program to be executed, the switching being performed in response to mode switching between the four modes, the first program being executed by the processor in the first mode, the second program being executed by the processor in the second mode, the third program being executed by the processor in the third mode.

* * * * *